Aug. 13, 1929.  C. J. CRAIG  1,724,564

COASTER VEHICLE

Filed Dec. 27, 1927   2 Sheets-Sheet 1

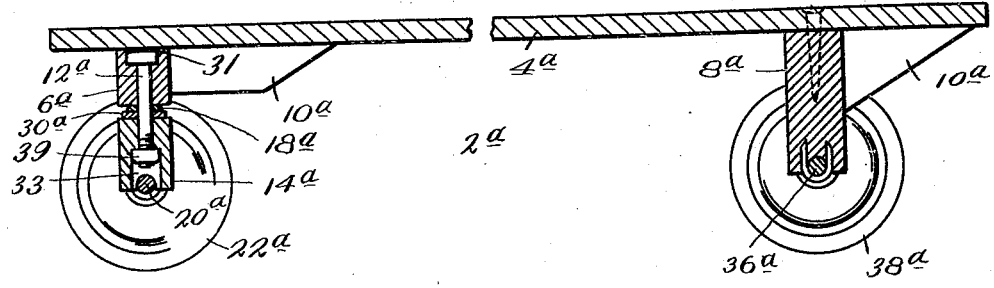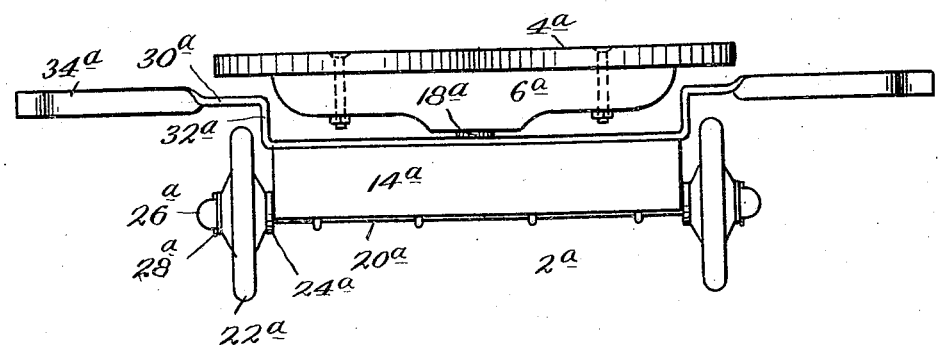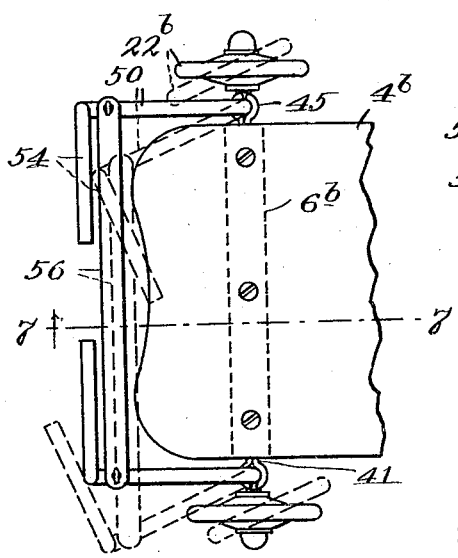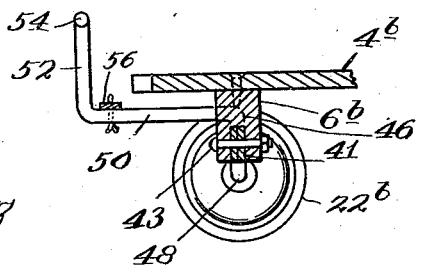

Patented Aug. 13, 1929.

1,724,564

UNITED STATES PATENT OFFICE.

CHESTER J. CRAIG, OF KANSAS CITY, MISSOURI, ASSIGNOR OF THIRTY PER CENT TO GUY C. TURNER, THIRTY PER CENT TO ADRIAN P. LADISH, FIFTEEN PER CENT TO JESSE T. SKEEN, AND TEN PER CENT TO ROBERT F. BURNS, ALL OF KANSAS CITY, MISSOURI.

COASTER VEHICLE.

Application filed December 27, 1927. Serial No. 242,694.

My invention relates to wheeled vehicles and one object is to provide for summer use a coaster vehicle which in a manner is the equivalent of the hand-sled of winter. A further object is to provide a vehicle having a low body portion mounted upon four small wheels and provided with a steering mechanism which can be grasped with both hands by a child lying head foremost upon said body portion.

Another object is to provide a coaster vehicle which can be manufactured at low cost and is of light but durable construction.

In order that the invention may be fully understood, reference will now be had to the accompanying drawings, in which:

Fig. 1 is a side elevation of one form of the vehicle.

Fig. 2 is a vertical cross section on line 2—2 of Fig. 1.

Fig. 3 is a vertical cross section on line 3—3 of Fig. 1.

Fig. 4 is a broken longitudinal section of a modified form of the vehicle.

Fig. 5 is a front elevation of the vehicle disclosed by Fig. 4.

Fig. 6 is a broken plan view of another modified form of the vehicle.

Fig. 7 is a section on line 7—7 of Fig. 6.

Referring more particularly to the form disclosed by Figs. 1 to 3, inclusive, 2 designates a coaster vehicle which is provided with a body portion consisting of a platform 4 made preferably from one piece of sheet metal of suitable gage. The forward under portion of the sheet metal platform 4 extends downwardly and transversely to provide a front bolster 6, while its rear under portion extends downwardly in V-form at opposite sides to form longitudinal reinforcements 8 which extend forwardly to the bolster 6. The adjacent portions of the reinforcements 8 are folded to form wings 9 which are preferably welded to each other and the underside of the platform 4 to further reinforce the latter. The platform 4 is further reinforced by folding its margins over a rod 10 which is bent into the form of a hollow rectangle.

12 designates a king-bolt extending downwardly through the front portion of the platform 4 and the center of the bolster 6 to provide a pivot for a yoke 14. Said king-bolt 12 also extends through a tubular spacing member 16 which is interposed between the platform 4 and the bolster 6 to coact with the latter in preventing the forward portion of said platform from sagging beneath the weight of an occupant. A washer 18 is mounted upon the king-bolt 12 at a point between the bottom of the bolster 6 and the top of the yoke 14 to permit the latter to turn upon said king-bolt 12 without coming into frictional engagement with said bolster 6.

20 designates a front axle mounted in the lower ends of the yoke 14 and upon the ends of which a pair of front wheels 22 are rotatably mounted. The wheels 22 are held from lateral movement upon the front axle 20 by washers 24 and 26, the former of which are interposed between the yoke 14 and the adjacent ends of the wheel hubs, while the washers 26 are secured upon the outer ends of the axle 10 by suitable means such as pins 28.

30 designates a steering bar secured upon the yoke 14. Said steering bar extends upwardly from the ends of the yoke 14 as indicated at 32, and thence outwardly over the front wheels 22 where it terminates in handles 34 which may be grasped by a child lying upon the platform 4. The handles 34 project a suitable distance beyond the adjacent sides of the platform 4 to prevent the hands of the operator from coming into contact with said platform when steering the vehicle around a turn.

36 designates a rear axle which is mounted in the longitudinal reinforcements 8 and provided at its ends with wheels 38 which are held from lateral movement by washers 40 and 42 disposed at opposite ends of the wheel hubs. The washers 42 are secured to the ends of the axle 36 by suitable pins 44.

From the foregoing it will be understood that I have provided a durable metal coaster of strong but economical construction.

Referring now more particularly to the form disclosed by Figs. 4 and 5, $2^a$ designates a coaster vehicle which is largely of wooden construction and embodies a platform $4^a$ mounted upon front and rear bolsters $6^a$ and $8^a$, respectively.

$10^a$ designates blocks or braces which aid in securing the platform $4^a$ and the front and rear bolsters together.

$12^a$ designates a king-bolt which extends centrally through the front bolster 6ª and an axle 14ª, upon which latter said front bolster is pivotally mounted. The axle 14ª is fixedly mounted upon a front axle shaft 20ª upon which a pair of front wheels 22ª are rotatably mounted. The wheels 22ª are held from lateral movement upon the axle shaft 20ª by means of washers 24ª and 26ª, disposed at opposite ends of the wheel hubs. The washers 26ª are secured to the axle shaft 20ª by suitable means as pins 28ª

30ª designates a steering bar extending longitudinally of and fixedly mounted upon the axle 14ª and provided with a central opening through which the king-bolt 12ª extends. Said steering bar 30ª extends upwardly from the ends of the axle 14ª as indicated at 32ª and then outwardly over the front wheels 22ª in a horizontal plane and terminates in handles 34ª.

A washer 18ª mounted upon the king-bolt 12ª is interposed between the front bolster 6ª and the steering bar 30ª so that the latter may be turned on the king-bolt to guide the vehicle without rubbing against the under side of said bolster 6ª.

As shown by Fig. 4 the king-bolt 12ª is provided at its lower end with an angular nut 39 to prevent the front bolster 6ª and the axle 14ª from becoming accidently disconnected while the vehicle is in use. As a precaution against the king-bolt 12ª from unscrewing from the nut 39, the rectangular head of said king-bolt 12ª is fitted snugly within a corresponding recess 31 formed in the upper portion of the bolster 6ª, and in order to prevent the nut 39 from unscrewing from the king-bolt 12ª said nut is fitted snugly in a corresponding cavity 33 in the under side of the axle 14ª.

The rear bolster 8ª is fixedly mounted upon an axle 36ª upon which a pair of wheels 38ª are rotatably mounted.

Referring now to the form disclosed by Figs. 6 and 7, 4ᵇ designates a platform which may be mounted upon bolsters in the same manner as the form disclosed by Figs. 4 and 5, the front bolster 6ᵇ, however, being the only one shown, as the main difference between this form and those disclosed by the other figures of the drawings resides in the steering mechanism which will now be described in detail.

As shown by Fig. 7, the under portion of the front bolster 6ᵇ has a groove in which a pair of metallic straps 41 are securely clamped by suitable means such as bolts 43. The straps 41 are bent in semi-circular formation at their ends to constitute vertical bearings 45 in which the upright portions 46 of a pair of rods are mounted. The lower portions of the rods 46 are bent outwardly to form stub axles 48 upon which a pair of front wheels 22ᵇ are rotatably mounted. Those portions of the rods projecting from the upper portions of the bearings 45 extend forwardly in a horizontal plane as indicated at 50 beyond the forward portion of the platform 4ᵇ, thence upwardly as indicated at 52, and inwardly toward each other to form handles 54 which may be grasped for the purpose of steering the vehicle. In order to cause the rods to turn in unison their forwardly projecting horizontal portions 50 are united by a pivoted connecting bar 56.

While I have shown three forms of my vehicle, I reserve all rights to such other forms and modifications thereof as properly fall within the spirit and scope of the invention as claimed.

Having thus described my invention, what I claim and desire to secure by Letters Patent, is:

1. A coaster vehicle consisting of front and rear axles, wheels mounted upon said axles, a yoke mounted upon the front axle, steering means secured to said yoke, and a unitary member comprising a sheet metal platform having longitudinal reinforcements mounted upon the rear axle and a bolster portion to which latter said yoke is pivotally connected.

2. A coaster vehicle consisting of front and rear axles, wheels mounted upon said axles, a yoke mounted upon the front axle, steering means secured to said yoke, and a platform formed from one piece of sheet metal and having V-shaped longitudinal reinforcements mounted upon the rear axle and a transverse bolster to which latter the yoke is pivotally connected, the adjacent ends of said longitudinal reinforcements comprising wings which are secured to the underside of the platform.

3. A coaster vehicle consisting of front and rear axles, wheels mounted upon said axles, a yoke mounted upon the front axle, steering means secured to said yoke, a sheet metal platform having integral longitudinal reinforcements mounted upon the rear axle and an integral bolster portion, a king-bolt extending through the platform and bolster portion and upon which the yoke is pivotally mounted, and a sleeve surrounding said king-bolt and interposed between said platform and the bolster portion.

In testimony whereof I affix my signature.

CHESTER J. CRAIG.